Nov. 13, 1956 J. S. SCHEURICH 2,770,703
TRANSDUCER
Filed May 28, 1953

INVENTOR.
JOHN S. SCHEURICH
BY
ATTORNEY.

United States Patent Office 2,770,703
Patented Nov. 13, 1956

2,770,703

TRANSDUCER

John S. Scheurich, Minneapolis, Minn., assignor to Northern Pump Company, Minneapolis, Minn., a corporation of Minnesota Application May 28, 1953, Serial No. 358,063

1 Claim. (Cl. 201—63)

This invention relates to transducer comprising part of a device for measuring pressures. While different kinds of pressures might be measured by said device, it particularly is designed for measuring pressures of fluids or liquids. Such a device is sometimes called a transducer.

It is an object of this invention to provide a device usable in measuring pressures, which device is of simple and efficient construction and which comprises broadly a ring of metal held rigidly between a rigid surface and a diaphragm, said ring having secured to its outer and inner sides respectively strain gages, together with means for conducting fluid to the side of said diaphragm opposite said ring.

It is a further object of the invention to provide such a structure as above set forth comprising a casing having a chamber therein in which said ring is disposed, said diaphragm extending across said chamber.

It is another object of the invention to provide such a structure as set forth above, together with a bar extending through said ring and engaging the same, said bar being connected to said casing by screws passing therethrough adjacent its ends whereby said ring is rigidly clamped at one side to said casing and said screws may be moved to release said ring so that it may be rotated about its central axis and thus be clamped in various positions.

It is more specifically an object of this invention to provide a transducer comprising a casing having a chamber therein, a rigid plate engaging one end of said chamber, a ring disposed in said chamber having one outer side engaging said plate, a diaphragm extending across said chamber and engaging the outer side of said ring substantially opposite the point engaged by said plate, means for clamping said ring against said plate for holding it rigidly in position, a pair of strain gages secured to the inner and outer sides of said ring between said points of engagement, said casing having a second chamber therein, tubes connecting said chambers and passing through said plate, conductors secured to said strain gages and passing through said tubes respectively into said second chamber, a member secured to said casing and extending to said second chamber through which said conductors pass, and means for conducting fluid to said first mentioned chamber at the side of said diaphragm opposite said ring.

These and other objects and advantages of the invention will be fully set forth in the following description made in connection with the accompanying drawings in which like reference characters refer to similar parts throughout the several views and in which.

Figure 2:
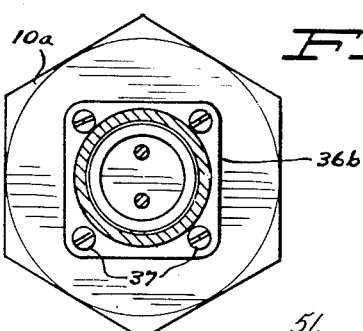
Fig. 2 is a vertical section taken on line 2—2 of Fig. 1, as indicated by the arrows.

Referring to the drawings, a device is shown comprising a casing 10. While casing 10 could be variously made, in the embodiment of the invention illustrated it is shown as being cylindrical with a portion 10a of enlarged diameter at one end. As shown in Fig. 2, portion 10a is of hexagonal form. Casing 10 is preferably made of metal, such as steel. Casing 10 is bored at one end to provide a chamber 10b. A rigid plate 11 is disposed in one end of said chamber and engages member 10 at said end. A ring 12 is disposed in chamber 10b and while this ring might take various forms, in the embodiment of the invention illustrated it is shown as of rectangular form in radial cross section. Ring 12 engages plate 11 at one outer side of said ring. A diaphragm 14 extends transversely of chamber 10b and engages the outer side of ring 12 substantially opposite the portion engaged by plate 11. Ring 12 is clamped to casing 10 and for this purpose a bar 16 extends through said ring, said bar being formed to engage the inner side of said ring and being secured to casing 10 by a pair of headed screws 17, only one of which is shown, which pass through holes in plate 11 and are threaded into casing 10. Ring 12 is thus spaced from the cylindrical wall of chamber 10b and is rigidly held in position between diaphragm 14 and plate 11. Diaphragm 14 engages a shoulder formed by a counter-bore in casing 10 and is engaged at its opposite side by a member 18 disposed in said counter-bore. Sealing rings 20 are disposed in annular grooves in casing 10 and member 18 and engage diaphragm 14 at opposite sides respectively. Member 18 has a shoulder 18a thereon engaged by the end of a member 21 threaded into member 10 and having a hexagonal head at its outer end. Member 18 has a portion extending through member 21 and spaced slightly from the wall of a bore in member 21. Member 18 has a passage 18b extending axially therethrough and extending to chamber 10b. A member 22 is threaded in member 18 adjacent the inner end of passage 18b, the same having an axial passage 22a extending therethrough, the inner end of which is of much smaller diameter than passage 18b. The outer end of the passage 18b is threaded to have connected thereto a conduit 24.

Figure 4:
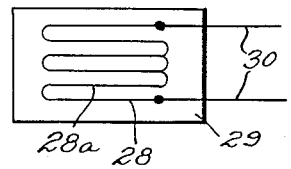
Fig. 4 is a plan view of a strain gage used.

Casing 10 is bored at its other end and provided with a second chamber 10c. A pair of strain gages 25 and 26 are connected to the outer and inner sides of ring 12 between the portions engaged by plate 11 and diaphragm 14. These strain gages are illustrated in Fig. 4 and consist of a wire 28 formed into convolutions 28a and held between a pair of sheets of paper or similar material 29. Said gages 25 and 26 are attached to the inner and outer surfaces respectively of ring 12 by any suitable adhesive or cement. Conductors 30 are connected to the ends of wire 28 and extend therefrom. These strain gages are now well known in the art. Conductors 32 and conductors 33 extend from gages 25 and 26 respectively and respectively pass through a pair of tubes 34 which extend from chamber 10b to chamber 10c and pass through plate 11. Said conductors also pass through a member 36 having a portion 36a fitting in the bore in the end of casing 10. Member 36 has a flange portion 36b formed thereon illustrated as of substantially square form in plan. Headed screws 37 pass through flange 36b and are threaded into casing 10. A gasket 38 is disposed between flange 36b and the end of casing 10. Member 36 has an outer cylindrical portion 36c which is exteriorly threaded. A connecting knurled connecting cap 40 is threaded on portion 36c and holding in place a conduit 41 which carries the conductors 32 and 33.

In operation, the fluid, the pressure of which is to be measured, is supplied through conduit 24. The fluid passes through passage 22a in member 22 and is delivered to chamber 10b at one side of diaphragm 14. The pressure will deflect the diaphragm and the pressure will be transmitted through the diaphragm to the ring 12. Ring 12 will be distorted and the diameter thereof coincident with the axis of casing 10 will be somewhat reduced so that the ring will be very slightly oblong. When the ring is so distorted a strain in tension is placed on the gage 25 while a strain in compression is placed on gage 26.

Figure 1:
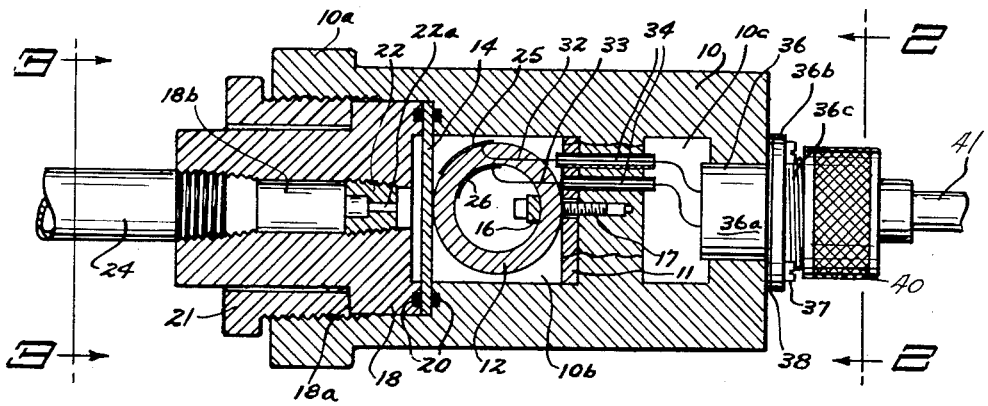
Fig. 1 is a central longitudinal section through the device.
Figure 5:
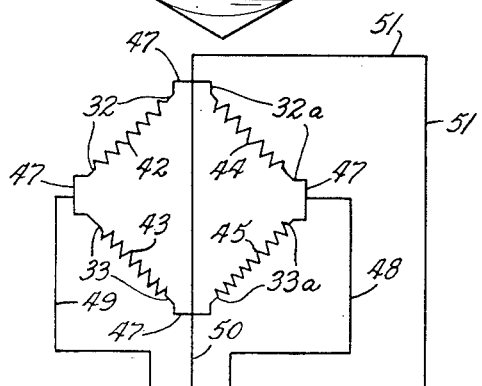
Fig. 5 is a diagram of a typical electrical circuit illustrating the use of the device.
Figure 3:
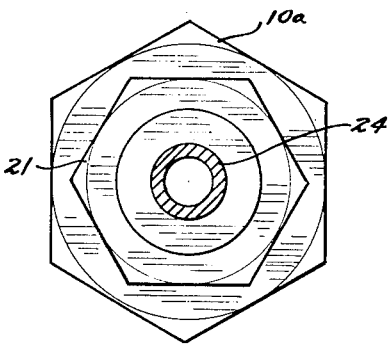
Fig. 3 is a vertical section taken on line 3—3 of Fig. 1, as indicated by the arrows.

The transducer is used with an amplifier and with some type of recording instrument, such as an oscillograph. In Fig. 5 a diagram is shown which shows the arrangement of the instruments. One advantage of the transducer illustrated is that it can be used in pairs to measure differential pressures or the difference between two pressures. This makes it of great utility in measuring the pressures in hydraulic units and apparatus where there is frequently an inlet or pressure line and a discharge line. In many units one line will alternately be the inlet or pressure line and the discharge line. The hook-up for such an operation is shown in Fig. 5. Assuming that a hydraulic unit has a pressure or inlet conduit and a discharge conduit, a transducer as illustrated will be placed in communication with each of these conduits. One of the strain gages in one of the transducers is designated 42 on the diagram in Fig. 5, and the other is designated 43. One strain gage in the second transducer used in designated 44 and the other strain gage in said transducer is designated 45. The conductors 32 leading from one gage, as illustrated in Fig. 1, are shown in said diagram, and the conductors 33 leading from the other gage are also shown. The similar conductors leading from the strain gage in the transducer in the other hydraulic line are designated 32a, and the conductors from the second gage in the transducer in the other line are designated 33a. The said conductors from the four gages are connected by the conductors 47 in the diagram. It will be seen that the arrangement forms a Wheatstone bridge. Conductors 48 and 49 lead from one side of the bridge illustrated, and another pair of conductors 50 and 51 extend from the opposite side of the bridge. Conductors 48, 49, 50 and 51 are connected to a standard bridge amplifier 52 arranged to receive four conductors. The amplifier output is delivered through the conductor cable 53 to a recording instrument, such as an oscillograph. The oscillograph will record the output of the amplifier, which is essentially or substantially proportional to the difference in pressure in the two conduits. Obviously if only one of the transducers is used, only two strain gage elements would be used and the bridge arrangement would contain two dummy or inoperative strain gages. With such an arrangement the oscillograph would produce a graph showing the fluid pressure in one hydraulic line.

From the above description it will be seen that I have produced a comparatively simple and very efficient structure of pressure measuring element or transducer. The member 22 can be replaced by a similar member having a different diameter of passage 22a. By varying the size of passage 22a the damping of the instrument can be changed to eliminate undesired frequencies of pressure pulsations. All of the parts are quite simple and easily made and assembled. The strain gages are a standard product and it is understood that such a strain gage is a patented item and made exclusively by the Baldwin Southwark Company, of Philadelphia, Pennsylvania. Obviously different sizes of the rings 12 could be used.

The diaphragm 14 is an important element. The hydraulic pressure is not transmitted directly to the ring. The stiffness and capacity of deflection in the diaphragm is a component element in measuring the pressure. With the diaphragm, very high frequencies can be measured more easily and accurately than in a device where the pressure was directly transmitted to the ring. Frictional effects are minimized by this construction. The diaphragm 14 does not have a great inertia. Furthermore there is no binding of the diaphragm under any condition as it is quite free to deflect.

Due to variations in machining and other processing, it is practically impossible to produce two transducers which will give identical results. With the present construction the screws 17 which hold the clamping bar 16 in clamping position can be loosened and ring 12 can be rotated about its central axis to bring the gages 25 and 26 to a different position relative to the diaphragm 14. By so adjusting the ring 12, one transducer can be calibrated to give identical results with another. It is thus possible to have several of the present transducers calibrated so that they will produce uniform results. This is very important when the transducers are used in multiple arrangement.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

A device for measuring pressures having in combination, a casing having a chamber therein, a ring disposed in said chamber and having one side engaging a rigid surface at one end of said chamber, a diaphragm having one side in a plane tangentially engaging said ring at the opposite side thereof, means for holding said diaphragm in position, a member secured in said casing having a passage therethrough for fluid, said passage being disposed to transmit pressure of fluid therein to said diaphragm, a pair of strain gages secured respectively on the outer and inner side of said ring between said engaged sides thereof, electrical conductors extending from said gages, a bar extending through said ring at said first mentioned side, means extending through the ends of said bar and threaded into said casing for holding said ring rigidly in said casing, and said means being movable to release said ring so that it can be rotated about its central axis.

References Cited in the file of this patent
UNITED STATES PATENTS

| | | |
|---|---|---|
| 1,611,659 | Malivert | Dec. 21, 1926 |
| 2,260,837 | Kuehni | Oct. 28, 1941 |
| 2,494,621 | Jones | Jan. 17, 1950 |
| 2,580,407 | Clark | Jan. 1, 1952 |
| 2,585,350 | Russell | Feb. 12, 1952 |
| 2,680,376 | Shaw et al. | June 8, 1954 |